(12) United States Patent
Zhou et al.

(10) Patent No.: US 12,246,972 B2
(45) Date of Patent: Mar. 11, 2025

(54) SOLID PRECIPITATION APPARATUS AND SOLID PRECIPITATION PROCESS

(71) Applicants: CHINA PETROLEUM & CHEMICAL CORPORATION, Beijing (CN); DALIAN RESEARCH INSTITUTE OF PETROLEUM AND PETROCHEMICALS, SINOPEC CORP., Liaoning (CN)

(72) Inventors: Tong Zhou, Liaoning (CN); Xiangchen Fang, Liaoning (CN); Hongshan Guo, Liaoning (CN); Tao Yang, Liaoning (CN); Guangan Jiang, Liaoning (CN); Zhaohui Meng, Liaoning (CN)

(73) Assignees: CHINA PETROLEUM & CHEMICAL CORPORATION, Beijing (CN); DALIAN RESEARCH INSTITUTE OF PETROLEUM AND PETROCHEMICALS, CORP., Liaoning (CN)

( * ) Notice: Subject to any disclaimer, the term of this patent is extended or adjusted under 35 U.S.C. 154(b) by 884 days.

(21) Appl. No.: 17/419,157

(22) PCT Filed: Dec. 27, 2019

(86) PCT No.: PCT/CN2019/129198
§ 371 (c)(1),
(2) Date: Jun. 28, 2021

(87) PCT Pub. No.: WO2020/140841
PCT Pub. Date: Jul. 9, 2020

(65) Prior Publication Data
US 2022/0106209 A1  Apr. 7, 2022

(30) Foreign Application Priority Data
Dec. 31, 2018 (CN) .......................... 201811651664.9

(51) Int. Cl.
C02F 1/52 (2023.01)
B01J 8/00 (2006.01)
(Continued)

(52) U.S. Cl.
CPC ............. *C02F 1/5236* (2013.01); *B01J 8/003* (2013.01); *B01J 8/008* (2013.01); *B01J 8/08* (2013.01);
(Continued)

(58) Field of Classification Search
None
See application file for complete search history.

(56) References Cited

U.S. PATENT DOCUMENTS 4,246,102 A * 1/1981 Hjelmner .............. C02F 1/5281
210/765
4,861,493 A   8/1989 Jansen
(Continued)

FOREIGN PATENT DOCUMENTS

CN    2229450 Y    6/1996
CN    1548381 A    11/2004
(Continued)

OTHER PUBLICATIONS

Gu, Weiwei; "Research of Modified Alumina Prepared through Gelification"; Chinese Master's Theses Full-Text Database, Engineering Technology 1; No. 4, Apr. 15, 2009; pp. 1-57.
(Continued)

*Primary Examiner* — Richard C Gurtowski
(74) *Attorney, Agent, or Firm* — Allen Xue; NKL Law

(57) ABSTRACT

The present invention relates to a solid precipitation apparatus and a solid precipitation process, wherein said apparatus and said process, particularly when used for the desalination of a high-salinity wastewater, can meet the requirement of stable operation for a long period, can realize efficient removal of salts from the wastewater, and solve the problems of difficult desalination of high-salinity wastewater, easy blockage, and the like. The solid precipitation apparatus comprises a housing, an inlet for a stream, a discharging outlet, and a support disposed in an inner chamber of said housing, wherein the configuration of said support is suitable for a solid substance to be deposited and loaded thereon.

28 Claims, 4 Drawing Sheets

(51) Int. Cl.
  *B01J 8/08* (2006.01)
  *C02F 1/66* (2023.01)
  *C02F 1/72* (2023.01)
  *C02F 1/74* (2023.01)
  *C02F 101/30* (2006.01)
  *C02F 103/08* (2006.01)

(52) U.S. Cl.
  CPC .......... *C02F 1/5209* (2013.01); *C02F 1/5263* (2013.01); *C02F 1/66* (2013.01); *C02F 1/727* (2013.01); *C02F 1/74* (2013.01); *B01J 2208/00805* (2013.01); *B01J 2208/0084* (2013.01); *C02F 2101/30* (2013.01); *C02F 2103/08* (2013.01); *C02F 2201/002* (2013.01); *C02F 2209/02* (2013.01); *C02F 2209/03* (2013.01); *C02F 2209/06* (2013.01)

(56) References Cited

U.S. PATENT DOCUMENTS

| | | | |
|---|---|---|---|
| 6,235,203 | B1 | 5/2001 | Lee et al. |
| 2003/0192834 | A1* | 10/2003 | Titmas .................... C02F 1/72 210/761 |
| 2013/0126442 | A1 | 5/2013 | Bakas et al. |

FOREIGN PATENT DOCUMENTS

| | | |
|---|---|---|
| CN | 101376092 A | 3/2009 |
| CN | 102674488 A | 9/2012 |
| CN | 102698463 A | 10/2012 |
| CN | 103011442 A | 4/2013 |
| CN | 103274438 A | 9/2013 |
| CN | 104326615 A | 2/2015 |
| CN | 105036325 A | 11/2015 |
| CN | 105110542 A | 12/2015 |
| CN | 105363392 A | 3/2016 |
| CN | 105461134 A | 4/2016 |
| CN | 108751384 A | 11/2018 |
| CN | 108862698 A | 11/2018 |
| EP | 0268225 A2 | 5/1988 |
| JP | H02111497 A | 4/1990 |
| JP | H09276880 A | 10/1997 |
| JP | 2003071468 A | 3/2003 |
| JP | 2003251368 A | 9/2003 |
| KR | 100986220 B1 | 10/2010 |
| RU | 2251537 C2 | 5/2005 |
| SU | 1209251 A1 | 2/1986 |
| TW | 200838809 A | 10/2008 |
| TW | 201018650 A | 5/2010 |
| TW | 201520175 A | 6/2015 |
| TW | I523816 B | 3/2016 |

OTHER PUBLICATIONS

Tang, Guogi et al.; Research progress of γ-alumina support; Chemical Industry and Engineering Progress; vol. 30, No. 8; Dec. 31, 2011; pp. 1756-1765.

Zhao, Yan; "Acidity of Alumina, Modified Alumina and Aluminum Silicate"; Industrial Catalysis; vol. 10, No. 2; Mar. 31, 2002; pp. 54-58.

* cited by examiner

SOLID PRECIPITATION APPARATUS AND SOLID PRECIPITATION PROCESS

CROSS REFERENCES TO RELATED APPLICATIONS

The present application is a U.S. national stage entry of International Application No. PCT/CN2019/129198, filed Dec. 27, 2019, which claims the priority to the Chinese Patent application CN 201811651664.9 submitted to China National Intellectual Property Administration on Dec. 31, 2018, which is entitled "SOLID PRECIPITATION DEVICE AND SOLID PRECIPITATION METHOD". The entire contents of the prior application are incorporated herein by reference.

TECHNICAL FIELD

The present invention relates to a solid precipitation apparatus, in particular to a desalination apparatus for high-salinity wastewater. The present invention also relates to a process for performing the solid precipitation with said solid precipitation apparatus.

BACKGROUND TECHNOLOGY

The high-salinity wastewater refers to a wastewater with the total salt mass fraction of at least 1%. The salt content of the wastewater emitted in certain industrial industries, such as production processes of oil production, printing and dyeing, paper manufacture, pharmacy, chemical industry and the like, is generally about 15-25%, and the wastewater contains various substances (including salt, oil, organic matters, heavy metals and radioactive substances), and if the wastewater is directly emitted without treatment, the wastewater can generate great harm to aquatic organisms, domestic drinking water and industrial and agricultural production water.

At present, the researches on the high-salinity wastewater at home and abroad mainly comprise biological methods, physicochemical methods and the like. The biological method shows higher organic matter removal rate when treating high-salinity wastewater, but high-concentration salt substances have an inhibiting effect on microorganisms, and the salt content of the charged water needs to be controlled. The physicochemical method mainly comprises an evaporation method, an electrochemical method, an ion-exchange method, a membrane separation technology and the like, but all have the problems of high investment, high operation cost, being prone to secondary pollution of regenerated wastewater and the like, and the expected purification effect is difficult to achieve.

CN105461134A discloses a process and an apparatus for recycling the high-salinity wastewater in the coal chemical industry, which recovers water, sodium chloride and sodium sulfate in the industrial wastewater through three units of a nanofiltration salt separation unit, a double-in and double-out multiple-effect evaporation unit and a mother liquor aging treatment unit.

CN104326615A discloses an energy-saving high salinity wastewater treatment system and treatment method. The system includes a positive osmosis salt concentration apparatus and a multiple-effect evaporator, wherein the positive osmosis salt concentration apparatus includes an FO membrane closed exchange box, a draw solution recovery utilization apparatus and a clear water recovery apparatus, at least one stage of the FO membrane closed exchange box is provided, the draw solution recovery utilization apparatus is connected respectively to all stages of the FO membrane closed exchange box through electric valves; the clear water recovery apparatus is connected to the draw solution recovery utilization apparatus; all stages of the FO membrane closed exchange box are sequentially connected through liquid discharging electric valves and all connected to a mother liquor multiple-effect evaporator through bypass electric valves.

CN105110542A discloses a zero-emission salt separation and purification method for industrial high-salinity wastewater. The method comprises the steps of firstly recovering sodium sulfate in strong brine by a refrigeration process, passing the discharged brine through an evaporator to further increase the brine concentration to 25-30%, then passing the brine into a forced circulation crystallizer, when the solid content in the crystallizer reaches 30-35%, starting to discharge into a hydrocyclone separator by a circulating pump to realize the preliminary solid-liquid separation, passing the separated crystals containing a small amount of mother liquor into a centrifuge for the complete solid-liquid separation, and passing the mother liquor which is removed by centrifuge directly into a mother liquor tank.

SUMMARY OF THE INVENTION

The inventors of the present invention have found a solid precipitation apparatus and a solid precipitation process through an industrious research, wherein said apparatus and said process, particularly when used for the desalination of a high-salinity wastewater, can meet the requirement of stable operation for a long period, can realize efficient removal of salts from the wastewater, and solve the problems of difficult desalination of high-salinity wastewater, easy blockage, and the like.

Specifically, the present invention relates to the following aspects:

1. A solid precipitation apparatus (especially a desalination apparatus), comprises a housing (for example vertical housing, especially vertical cylindrical housing), an inlet for a stream (for example solution, sea water or wastewater, especially salt-containing wastewater or high-salinity wastewater, which comprises a solvent and a solute), a discharging outlet (namely a stream outlet), and a support disposed in an inner chamber of said housing, wherein the configuration of said support is suitable for a solid substance to be deposited and loaded thereon.

2. The solid precipitation apparatus accoridng to any of the above-mentioned or the afterward-mentioned aspects, which is operated under a supercritical condition (especially under a supercritical condition of said solvent such as water).

3. The solid precipitation apparatus accoridng to any of the above-mentioned or the afterward-mentioned aspects, wherein said support is selected from at least one of solid particle (for example selected from at least one of crystal seeds, inorganic particles such as alumina sphere, silica sphere, sand, quartz sand, refractory material particles such as ceramic particles, and solid waste such as slag), plate (such as non-porous plate and porous plate), grid, mesh, cage, fiber and strip, preferably solid particle.

4. The process accoridng to any of the above-mentioned or the afterward-mentioned aspects, wherein the used amount (by volume) of said solid particle comprises ¼-¾ (preferably ¼-½) of the total volume of the inner chamber of said housing, and/or, the equivalent diameter of said solid particle is 0.1-1.0 mm (preferably 0.2-0.7 mm), and/or, the specific surface area of the said solid particle is 100-300 m$^2$/g, and/or, the bulk density of said solid particle is 0.6-0.7 g/cm$^3$.

5. The solid precipitation apparatus accoridng to any of the above-mentioned or the afterward-mentioned aspects, also comprising an inner member disposed in (especially the upper part of) the inner chamber of said housing, wherein said inner member comprises a hollow tube substantially coaxial with the central axis of said housing, the upper and lower ends of said hollow tube are open, said hollow tube comprises an upper straight tube section and a lower conical diffusion section, there exists a gap (referred to as the first gap, especially an annular gap) between the internal wall of said housing and the external wall of said hollow tube, said inner member also comprises a baffle (such as an umbrella cap, said baffle is preferably substantially coaxial with the central axis of said housing) located above said hollow tube, there exists a gap (referred to as the second gap, especially an annular gap) between said baffle and the upper edge of said hollow tube, and there exists a gap (referred to as the sixth gap, especially an annular gap) between said baffle and the internal wall of said housing.

6. The solid precipitation apparatus accoridng to any of the above-mentioned or the afterward-mentioned aspects, wherein said umbrella cap is coaxial with said hollow tube, and has a cone angle of 30-150° (preferably 60-120°), and/or, the outer diameter of said straight tube section of said hollow tube is 60-80% (preferably 67-73%) of the inner diameter of said housing, and/or, the height of the straight tube section of said hollow tube is 10-30% of the height of the inner chamber of said housing, and/or, the maximum outer diameter of said conical diffusion section of said hollow tube is 75-90% of the inner diameter of said housing, and/or, the height of said conical diffusion section of said hollow tube is 3-10% of the height of the inner chamber of said housing, and/or, the height of said baffle is 5-20% of the height of the inner chamber of said housing.

7. The solid precipitation apparatus accoridng to any of the above-mentioned or the afterward-mentioned aspects, which also comprises a guide structure disposed around the internal wall of said housing (preferably its longitudinal section along the central axis of the said housing is a trapezoid, the coverage angle Alpha and the friction angle Beta of said trapezoid are acute angle (preferably 5-70°), said guide structure surrounds the inner chamber of said housing to form a channel that is open at the top and bottom (especially cylindrical channel, referred to as guide opening), said guide structure is disposed below said hollow tube and above said stream inlet, there exists a gap (referred to as the third gap, especially an annular gap) between said guide structure and the lower edge of said hollow tube, and/or, said guide opening is substantially coaxial with the central axis of said housing, and/or, said guide structure is disposed in the upper part of the inner chamber of said housing.

8. The solid precipitation apparatus accoridng to any of the above-mentioned or the afterward-mentioned aspects, wherein said stream inlet is located at the bottom or the lower part of said housing, the structure of said stream inlet is suitable for spraying said stream into the inner chamber of said housing (the structure of said stream inlet is preferably a nozzle or a liquid distributor), and/or, said discharging outlet is located at the top or the upper part of said housing (preferably located above the said baffle), and/or, the ratio of the height of the inner chamber of said housing (the unit is m) to the inner diameter (the unit is m) is 7-17, preferably 10-14, and/or, the inner diameter of said guide opening is 60-80% of the inner diameter of said housing, and/or, the height of said guide opening is 5-15% of the height of the inner chamber of said housing.

9. The solid precipitation apparatus accoridng to any of the above-mentioned or the afterward-mentioned aspects, which also comprises a support charge inlet and a support discharging outlet, and/or, said support charge inlet is located at the top or the upper part of said housing (preferably located above said guide structure, more preferably located above the said baffle), and/or, said support discharging outlet is located at the bottom of said housing (preferably located below said stream inlet).

10. The solid precipitation apparatus accoridng to any of the above-mentioned or the afterward-mentioned aspects, which also comprises a hot-agent inlet, said hot-agent inlet is located at the bottom or the lower part of said housing, the structure of said hot-agent inlet is fit for the hot-agent (for example air, oxygen gas or a heating gas) to spray into the inner chamber of said housing (the structure of said hot-agent inlet is preferably a nozzle or a gas distributor), and/or, said hot-agent inlet is located above or below said stream inlet (preferably located below said stream inlet).

11. The solid precipitation apparatus accoridng to any of the above-mentioned or the afterward-mentioned aspects, which also comprises an inner tube (for example straight tube-shaped or horn tube-shaped, especially straight cylinder-shaped, said inner tube is preferably substantially coaxial with the central axis of said housing), said hot-agent inlet is located at the bottom of said housing, there exists a gap between the internal wall of said housing and the external wall of said inner tube (referred to as the fourth gap, especially an annular gap), there exists a gap between the lower edge or the internal wall of said inner tube and said hot-agent inlet (referred to as the fifth gap, especially an annular gap), said fifth gap is communicated with said fourth gap and the inner space of said inner tube, said inner tube has such a configuration that said hot-agent imported from said hot-agent inlet substantially wholly enters the inner space of said inner tube, said stream inlet is disposed in said fourth gap and below the upper edge of said inner tube, and/or, the space of the inner chamber of said housing located below the upper edge of said inner tube is referred to as the buffer zone, then said buffer zone comprises 25-40% or 20-60% of the total volume of the inner chamber of said housing, and/or, the structure of said hot-agent inlet is a gas distributor (preferably substantially coaxial with the central axis of said housing), and said inner tube is located above said gas distributor or contains said gas distributor, both are partitioned by said fifth gap, and/or, said inner tube is located below said guide structure, and/or, said stream inlet is 100-500 mm lower than the upper edge of said inner tube in the vertical direction, and/or, the outer diameter of said inner tube is 60-80% (preferably 67-73%) of the inner diameter of said housing, and/or, the height of said inner tube is 20-60% (preferably 30-50%) of the height of the inner chamber of said housing, and/or, said inner tube is disposed in the lower part of the inner chamber of said housing.

12. A solid precipitation process (especially a desalination process), which comprises passing a stream containing a solute (such as an inorganic salt) and a solvent (such as water) into the solid precipitation apparatus accoridng to any of the above-mentioned or the afterward-mentioned aspects to cause at least a part of the solute to be deposited (for example precipitated due to a precipitation reaction or due to supersaturation) and loaded on said support disposed in the inner chamber of said housing.

13. The solid precipitation process accoridng to any of the above-mentioned or the afterward-mentioned aspects, wherein said stream, before entering said solid precipitation apparatus, is kept at a subcritical state (especially lower than the supercritical temperature of said solvent for example from room temperature to a temperature of 1-15° C., 4-10° C. or 6-8° C. lower than the supercritical temperature of said solvent (especially water), more especially at or higher than the supercritical pressure of said solvent but lower than the supercritical temperature of said solvent for example from room temperature to a temperature of 1-15° C., 4-10° C. or 6-8° C. lower than the supercritical temperature of said solvent (especially water)), and/or, the temperature of said support is higher than the supercritical temperature of said solvent (for example a temperature of 1-15° C., 4-10° C. or 6-8° C. higher than said supercritical temperature), and/or, a support is added to the inner chamber of said housing, and the temperature of said support is higher than the supercritical temperature of said solvent (for example a temperature of 1-15° C., 4-10° C. or 6-8° C. higher than said supercritical temperature), and/or, said support and said stream are in such a proportion that after mixing them, the temperature of said stream reaches or exceeds the supercritical temperature of said solvent.

14. The solid precipitation process accoridng to any of the above-mentioned or the afterward-mentioned aspects, wherein the operation conditions for the inner chamber of said housing include: the operation pressure is 23-35 MPaG (preferably 25-30 MPaG), the operation temperature is 350-650° C. (preferably 380-650° C., 450-600° C. or 450-550° C.), the stream residence time is 10-1800 seconds (preferably 60-600 seconds), and the space velocity is 1.5-270 $h^{-1}$.

15. The solid precipitation process accoridng to any of the above-mentioned or the afterward-mentioned aspects, wherein a hot-agent is added to the inner chamber of said housing, and said hot-agent is used in such an amount that said stream, after entering the inner chamber of said housing, forms the supercritical state (for example reaches or exceeds the supercritical temperature of said solvent), and/or, said stream is a salt-containing wastewater or a high salinity wastewater (especially a high salinity organic wastewater), said hot-agent is an oxidizing gas (for example oxygen gas or air), and/or, said hot-agent and said stream are in such a proportion that after mixing them, the temperature of said stream reaches or exceeds the supercritical temperature of said solvent, and/or, said hot-agent and said stream are in such a proportion that the temperature of said stream, upon leaving the upper edge of said inner tube, reaches or exceeds the supercritical temperature of said solvent, and/or, the used amount of said hot-agent is 100-500%, preferably 150-350% of the theoretical oxygen demand for the oxidation of said stream.

16. The solid precipitation process accoridng to any of the above-mentioned or the afterward-mentioned aspects, wherein a pH regulating agent is added to said stream and/or to the inner chamber of said housing, and said pH regulating agent is used in such an amount that the pH value of the content in the inner chamber of said housing is maintained at 9-13.

17. The solid precipitation process accoridng to any of the above-mentioned or the afterward-mentioned aspects, wherein said stream enters the lower part of the inner chamber of said housing from said stream inlet, said support enters the upper part of the inner chamber of said housing from said support charge inlet, and then enters the lower part of the inner chamber of said housing via said first gap, said third gap and said guide opening, said stream causes said support to be present in a flowing state, at least a part of said solute is deposited and loaded onto said support to form a loaded support, a part of said loaded support moves to the bottom of the inner chamber of said housing, and discharges the inner chamber of said housing from said support discharging outlet, another part of said loaded support moves to the upper part of the inner chamber of said housing along with said stream from which at least a part of the solute is removed (referred to as the purified stream), goes through said guide opening, enters said straight tube section from said conical diffusion section, and then discharges from said second gap, said loaded support refluxes to the lower part of the inner chamber of said housing via said first gap, said third gap and said guide opening, said purified stream moves to the top of the inner chamber of said housing via said the sixth gap, and discharges the inner chamber of said housing from said discharging outlet, or, Said support enters the upper part of the inner chamber of said housing from said support charge inlet, and then enters the lower part of the inner chamber of said housing via said first gap, said third gap and said guide opening, Said stream enters said fourth gap from said stream inlet, and then enters the inner space of said inner tube via said fifth gap, and mixes with said hot-agent that enters the inner space of said inner tube from said hot-agent inlet to form a mixture, which discharges said inner tube from the upper edge of said inner tube after the temperature rises to reach or exceed the supercritical temperature of said solvent, A part of said mixture refluxes to the inner space of said inner tube via said fourth gap and said fifth gap (forming an internal recycle), another part of said mixture causes said support to be present in a flowing state, at least a part of said solute is deposited and loaded onto said support to form a loaded support, a part of said loaded support moves to the bottom of the inner chamber of said housing via said fourth gap, and discharges the inner chamber of said housing from said support discharging outlet, another part of said loaded support moves to the upper part of the inner chamber of said housing along with said mixture from which at least a part of the solute is removed (referred to as the purified mixture), goes through said guide opening, enters said straight tube section from said conical diffusion section, and then discharges from said second gap, said loaded support refluxes to the lower part of the inner chamber of said housing via said first gap, said third gap and said guide opening, said purified mixture moves to the top of the inner chamber of said housing via said the sixth gap, and discharges the inner chamber of said housing from said discharging outlet.

18. The solid precipitation process accoridng to any of the above-mentioned or the afterward-mentioned aspects, wherein said stream is a high salinity wastewater (especially a high salinity organic wastewater), said high salinity wastewater has a TDS of not higher than 20 wt % (preferably 5-20 wt %), and a COD of greater than 20000 mg/L (preferably 20000-200000 mg/L or 20000-40000 mg/L).

On the other side, the present invention relates to the following aspects:

1. A process for treating a high salinity organic wastewater, which is characterized by comprising the following contents: the high salinity organic wastewater and an oxidant is introduced into an ebullated bed reactor to react under a supercritical water oxidation condition, the salt in the wastewater is deposited onto solid particles of the ebullated bed reactor, and the stream-after-the-reaction meets the emission requirement after the gas-liquid separation.
2. The process accoridng to any of the above-mentioned or the afterward-mentioned aspects, which is characterized in that: in the high salinity organic wastewater, the COD is as high as tens of thousand mg/L to hundreds of thousand mg/L, preferably 20000-200000 mg/L, the TDS is not higher than 20 wt %, preferably 5 wt %-20 wt %.
3. The process accoridng to any of the above-mentioned or the afterward-mentioned aspects, which is characterized in that: the oxidant is at least one of air and oxygen gas, and the used amount is 100%-500%, preferably 150%-350% of the theoretical oxygen demand for the oxidation of wastewater.
4. The process accoridng to any of the above-mentioned or the afterward-mentioned aspects, which is characterized in that: the solid particle in the ebullated bed reactor is at least one of alumina ceramic pellet and silica pellet.
5. The process accoridng to any of the above-mentioned or the afterward-mentioned aspects, which is characterized in that: the solid particle has a diameter of 0.1-1.0 mm, preferably 0.2-0.7 mm, a specific surface of 100-300 $m^2/g$ and a bulk density of 0.6-0.7 $g/cm^3$.
6. The process accoridng to any of the above-mentioned or the afterward-mentioned aspects, which is characterized in that: the solid particle is added in an amount of ¼-¾ of the volume of the reactor.
7. The process accoridng to any of the above-mentioned or the afterward-mentioned aspects, which is characterized in that: the ebullated bed reactor is provided with an on-line solid particle charging and discharging system, and the solid particles are periodically charged into and discharged out of the ebullated bed reactor.
8. The process accoridng to any of the above-mentioned or the afterward-mentioned aspects, which is characterized in that: the discharged salt-containing solid particles are subjected to ultrasonic, high-temperature stirring, polishing and the like to recover the salt deposited on the particles, so that the regeneration of the particles is realized.
9. The process accoridng to any of the above-mentioned or the afterward-mentioned aspects, which is characterized in that: the operating pressure of the supercritical water oxidation is 23 MPa-30 MPa, the operating temperature is 380° C.-650° C., preferably 450° C.-600° C., and the reaction time is 10 seconds to 180 seconds.
10. The process accoridng to any of the above-mentioned or the afterward-mentioned aspects, which is characterized in that: the stream after the supercritical water oxidation enters a gas-liquid separation tank, the liquid phase is discharged after heat exchange with the reactor feed wastewater, or the feed wastewater is diluted, the COD content entering the supercritical water oxidation reactor is kept stable, and the reaction is stably performed, avoiding a great fluctuation in the temperature in the reactor.
11. The process accoridng to any of the above-mentioned or the afterward-mentioned aspects, which is characterized in that: a proper amount of alkali liquor is added into the feed wastewater, and the pH of the charged water is controlled to 9-13.
12. The process accoridng to any of the above-mentioned or the afterward-mentioned aspects, which is characterized in that: the alkali liquor is at least one of sodium hydroxide solution and potassium hydroxide solution.

Technical Effect

The present invention can realize at least one of the following technical effects:

(1) The solid precipitation apparatus and process, particularly the desalination apparatus and process according to the present invention have easy operation, can meet the requirement of stable operation for a long period (such as continuous operation for 20 days or more, preferably continuous operation for 30 days or more, 50 days or more or 100 days or more), can realize the highly efficient removal of the salt in the wastewater, and solve the problems of the difficult desalination of the high-salinity wastewater and easy deposition or blockage in the apparatus and pipelines.

(2) The solid precipitation apparatus and process, particularly the desalination apparatus and process according to the present invention utilize the specific inner members to ensure the highly efficient separation of the solid particles and the desalted stream, avoid a large carry-over of solid particles, and simultaneously can guarantee the stable operation for a long period (for example, continuous run for 20 days or more, preferably continuous run for 30 days or more, 50 days or more, or 100 days or more).

(3) The solid precipitation apparatus and process, particularly the desalination apparatus and process according to the present invention arrange the buffer zone and utilize the heat release from the oxidation of the organic substances in the wastewater to raise the reaction temperature, therefore the control of the salt precipitation area is realized, not only the organic substances can be decomposed and removed, but also the deposition and the blockage at the bottom of the desalination apparatus are avoided, therefore the effect of killing two birds with one stone is achieved.

(4) According to one preferable embodiment of the present invention, aiming at the characteristics of the high-salinity organic wastewater, the ebullated bed reactor is combined with the supercritical water oxidation technology to treat the high-salinity organic wastewater. After the treatment, the desalinization ratio of the wastewater is higher than 95%, the COD removal rate can reach 99% or more, the COD of the discharged water is <60 mgL, and the requirement for the direct discharge is met.

DETAILED DESCRIPTION

Figure 1:
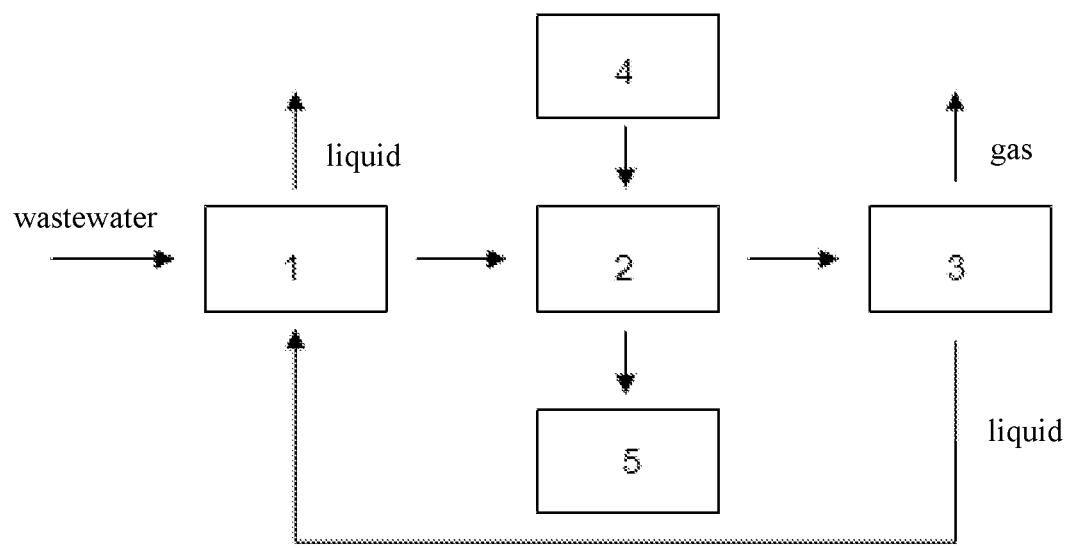
FIG. 1 is a flow diagram of one embodiment of the desalination process of the present invention.
wherein 1: heat exchanger, 2: ebullated bed reactor, 3: gas-liquid separation tank, 4: solid particle on-line charging system and 5: solid particle on-line discharging system.

Reference will now be made in detail to the present embodiments of the present invention, but it should be understood that the scope of the invention is not limited by the embodiments, but is defined by the appended claims.

All publications, patent applications, patents, and other references mentioned in this specification are herein incorporated by reference in their entirety. Unless defined otherwise, all technical and scientific terms used herein have the same meanings as commonly understood by those skilled in the art to which this invention belongs. In case of conflict, the present specification, including definitions, will control.

When the specification derives a material, a substance, a process, a step, a device, an element and the like with the expression such as "known to those skilled in the art", "prior art", or the anologous term, it is intended that the subject matter so derived encompasses those having been conventionally used in the art at the time of filing this application, but also includes those which may not be so commonly used at the present time, but will become known in the art as being suitable for a similar purpose.

In the context of the present specification, the term "substantially" means the allowance of the presence of a deviation acceptable to those skilled in the art or considered reasonable by those skilled in the art, for example, a deviation within±10%, within±5%, within±1%, within±0.5% or within±0.1%.

In the context of the present specification, normal temperature refers to 25° C.

In the context of the present specification, COD is determined by using the analytical method provided by HJ828-2017, TDS is determined by using the analytical method provided by HJT51-1999, and the bulk density is determined by using the analytical method provided by GB/T6286-1986.

In the context of the present specification, the size and shape of the various gaps (for example, the first gap to the sixth gap described in the following text of the present specification) are not particularly limited as long as they function as a communication passage allowing various materials (such as stream, support, loaded support, hot-agent and the like described in the following text of the present specification) to flow therethrough.

All percentages, parts, ratios, and the like referred to within this specification are by weight and pressures are gauge pressures unless explicitly indicated.

In the context of the present specification, any two or more embodiments of the present invention may be combined in any combination, and the resulting technical solution is part of the original disclosure of this specification, and is within the scope of the present invention.

According to one embodiment of the present invention, it refers to a solid precipitation apparatus. Herein, as said solid precipitation apparatus, specifically for example, any apparatus suitable for a case where it is necessary to precipitate at least a part of the solute in a stream including a solvent and a solute in a solid form due to a physical change (for example, a decrease in solubility to form a precipitate) can be enumerated; and more specifically for example, a desalination apparatus and a crystallization apparatus, and especially, a desalination apparatus can be enumerated. In the context of the present specification, the solid precipitation apparatus of the present invention is explained and illustrated in detail mainly by taking a desalination apparatus as an example, but it is obvious that the present invention is not limited to the desalination apparatus.

According to an embodiment of the present invention, as said stream, for example, solution, sea water or wastewater, especially salt-containing wastewater or high-salinity wastewater, especially organic substance-containing high-salinity wastewater (also known as high-salinity organic wastewater) can be specifically enumerated. However, the present invention is not limited to these specific streams, and any stream which includes a solvent and a solute and is intended to contain at least a part of the solute precipitated in solid form as described earlier in the present specification is suitable for use in the present invention. Herein, as said high-salinity wastewater, its TDS is generally not higher than 20 wt %, preferably 5-20 wt %. In the case of containing the organic substance, the COD of said high-salinity wastewater is generally greater than 20000 mg/L, preferably 20000-200000 mg/L or 20000-40000 mg/L.

According to one embodiment of the present invention, said stream is kept in a subcritical state before entering said solid precipitation apparatus, in particular below the supercritical temperature of said solvent, more especially at or above the supercritical pressure of the solvent (such as 23-35 MPaG, preferably 25-30 MPaG) but below the supercritical temperature of said solvent. Herein, as the temperature of said stream, for example, any temperature lower than the supercritical temperature of said solvent, particularly a temperature ranging from normal temperature to a temperature that is 1-15° C., 4-10° C. or 6-8° C. lower than the supercritical temperature of said solvent (especially water) can be enumerated.

According to one embodiment of the present invention, said solid precipitation apparatus comprises a housing (namely an apparatus housing), a stream inlet, a discharging outlet (namely stream outlet) and a support disposed in the inner chamber of said housing.

According to one embodiment of the present invention, as said housing, specifically for example, a vertical housing, particularly a vertical cylindrical housing can be enumerated.

According to one embodiment of the present invention, the ratio of the height of the inner chamber of said housing (the unit is m) to the inner diameter (the unit is m) is 7-17, preferably 10-14.

According to one embodiment of the present invention, the configuration of said support is suitable for a solid substance (for example various precipitates described in the foregoing in the present specification) to be deposited and loaded thereon, thereby forming a core-shell structure (also referred to as a loaded support) with the precipitates as an outer shell and the support as an inner core. When the loaded support grows to a predetermined size (namely the support is loaded with a predetermined amount of the precipitate), it can be removed or discharged from said solid precipitation apparatus according to the circumstances, simultaneously or after that, the removed or discharged support is replaced with a new support to continue the solid precipitation process. Herein, as the support, it may be any structure and shape capable of achieving the object, and specifically for example, solid particles, plates, grids, meshes, cages, fibers, strips and the like, and preferably solid particles can be enumerated.

In the context of the present specification, the so-called "wherein the configuration of said support is suitable for a solid substance to be deposited and loaded thereon" means that the configuration such as shape or structure of the support is designed such that a substantial portion of the solid substance (e.g., 80 wt % or more, 90 wt % or more, 95 wt % or more or 98 wt % or more of the total solid substance) is deposited and loaded thereon, either exclusively or intentionally.

According to one embodiment of the present invention, as said solid particles, specifically for example, the following can be enumerated: seed crystals such as inorganic salt particles, which is particularly suitable for the desalination or the crystallization; inorganic particles, particularly refractory material particles, specifically, alumina spheres, silica spheres, sand, quartz sand, ceramic particles and the like, which is particularly suitable for the desalination using the inorganic particles as the intermediary; solid waste, such as slag and solid garbage, which is particularly suitable for the waste recycling.

According to one embodiment of the present invention, in order to realize the optimal deposition and loading effect, said solid particle is contacted with said stream in said solid precipitation apparatus to form a fluidization or ebullience state. Hereby, said solid precipitation apparatus is sometimes also referred to as a fluidized bed reactor or an ebullating bed reactor.

According to one embodiment of the present invention, said solid particle may be of any size and shape suitable for packing into said solid precipitation apparatus, in particular, the equivalent diameter of said solid particles is generally 0.1-1.0 mm, preferably 0.2-0.7 mm. In addition, the specific surface area of the said solid particle is generally 100-300 $m^2/g$, and the bulk density is generally 0.6-0.7 $g/cm^3$.

According to one embodiment of the present invention, as the loading amount of said solid particles in said solid precipitation apparatus, specifically, for example, the used amount (by volume) of said solid particle generally comprises ¼-¾, preferably ¼-½ of the total volume of the inner chamber of said housing.

According to one embodiment of the present invention, as said plates, grids, meshes, cages, fibers, strips and the like, they can be any suitable structure and shape for installation in said solid precipitation apparatus, and are not particularly limited. For example, as said plate, the following can be particularly enumerated: a non-porous plate, where said precipitate is loaded on the plates; or a porous plate, where said precipitate is loaded on the plates and in the pores.

According to the present invention, when said solid particles are used as the support, the support is particularly suitable for a continuous operation, i.e., the support is continuously added to said solid precipitation apparatus and simultaneously the loaded support is continuously discharged, or particularly suitable for a batch operation, i.e., the support is periodically replaced according to the loading degree of the precipitate; when plates, grids, meshes, cages, fibers, strips and the like are used as support, the support is particularly suitable for a batch operation, i.e. the support is periodically replaced according to the loading degree of the precipitate.

According to one embodiment of the present invention, the loaded support discharged from said solid precipitation apparatus is subjected to ultrasonic, high-temperature stirring, polishing and the like to recover the precipitate deposited on the support, so that the regeneration of the support is realized.

According to one embodiment of the present invention, in the inner chamber of said housing, the stream residence time is generally 10-1800 seconds, preferably 60-600 seconds or 10-180 seconds, and the space velocity is generally 1.5-270 $h^{-1}$.

According to one embodiment of the present invention, the inner chamber of the housing of said solid precipitation apparatus is operated under a supercritical condition, especially under a supercritical condition of said solvent such as water. Herein, as said supercritical condition, specifically for example, the following can be enumerated: the operation pressure is 23-35 MPaG, preferably 25-30 MPaG, and the operation temperature is 350-650° C., preferably 450-600° C. or 450-550° C.

According to one embodiment of the present invention, in order to realize said supercritical condition, said support may be disposed in the inner chamber of said housing, and its temperature is set at a temperature above the supercritical temperature of said solvent, for example a temperature of 1-15° C., 4-10° C. or 6-8° C. higher than said supercritical temperature. Herein, said support and said stream are in such a proportion that after mixing them, the temperature of said stream reaches or exceeds the supercritical temperature of said solvent.

According to one embodiment of the present invention, in order to realize said supercritical condition, said support may be further added to the inner chamber of said housing, and the temperature of said support is higher than the supercritical temperature of the solvent, for example a temperature of 1-15° C., 4-10° C. or 6-8° C. higher than the supercritical temperature. Herein, said support and said stream are in such a proportion that after mixing them, the temperature of said stream reaches or exceeds the supercritical temperature of said solvent.

According to one embodiment of the present invention, said solid precipitation apparatus also comprises an inner member disposed in (especially the upper part of) the inner chamber of said housing. Herein, said inner member comprise a hollow tube substantially coaxial with the central axis of said housing, especially hollow cylinder. There should be a gap (referred to as the first gap) between the internal wall of the shell of said apparatus and the external wall of said hollow tube. In addition, said inner member also comprises a baffle located above said hollow tube. Preferably, said baffle is substantially coaxial with the central axis of said housing. In addition, there should be a gap (referred to as the second gap) between said baffle and the upper edge of said hollow tube, and there exists a gap (referred to as the sixth gap) between said baffle and the internal wall of said housing to be used as the in-and-out channel of the relevant streams. As the above-described gaps, annular gaps are preferable.

According to one embodiment of the present invention, said inner member is disposed in the upper part of the inner chamber of said housing.

According to one embodiment of the present invention, specifically for example, a platy structure or a cap-like structure, especially an umbrella cap can be enumerated as said baffle. Preferably, said umbrella cap is coaxial with said hollow tube, with a cone angle of typically 30-150°, preferably 60-120°. In addition, although not particularly limited, the height of said baffle is generally 5-20% of the height of the inner chamber of said housing.

According to one embodiment of the present invention, the upper and lower ends of said hollow tube are open, and said hollow tube comprises an upper straight tube section and a lower conical diffusion section. Herein, the outer diameter of said straight tube section of said hollow tube is generally 60-80%, preferably 67-73% of the inner diameter of said housing. Although not particularly limited, the height of the straight tube section of said hollow tube is generally 10-30% of the height of the inner chamber of said housing. Although not particularly limited, the maximum outer diameter of said conical diffusion section of said hollow tube (namely the outer diameter of the cone bottom) is generally 75-90% of the inner diameter of said housing. Although not particularly limited, the height of said conical diffusion section of said hollow tube is generally 3-10% of the height of the inner chamber of said housing.

According to one embodiment of the present invention, said solid precipitation apparatus also comprises a guide structure disposed around the internal wall of said housing. Said guide structure surrounds the inner chamber of said housing to form a channel that is open at the top and bottom (referred to as the guide opening), especially form a cylindrical channel that is open at the top and bottom. Preferably, the longitudinal section of said guide structure along the central axis of the said housing is a trapezoid, and the coverage angle Alpha and the friction angle Beta of said trapezoid are acute angle, preferably 5-70°. According to the present invention, there should exist a gap (referred to as the third gap) between said guide structure and the lower edge of said hollow tube. Preferably, said guide opening is substantially coaxial with the central axis of said housing. As said third gap, an annular gap is particularly preferable.

According to one embodiment of the present invention, the inner diameter of said guide opening is generally 60-80% of the inner diameter of said housing. In addition, the height of said guide opening is generally 5-15% of the height of the inner chamber of said housing.

According to one embodiment of the present invention, said guide structure is disposed below said hollow tube and above said stream inlet, and disposed in the upper part of the inner chamber of said housing.

According to one embodiment of the present invention, said stream inlet is located at the bottom or the lower part of said housing. Herein, the structure of said stream inlet is suitable for spraying said stream into the inner chamber of said housing. As said structure, for example, a nozzle or a liquid distributor can be enumerated, preferably a liquid distributor, especially a liquid distribution plate.

According to one embodiment of the present invention, said discharging outlet is located at the top or the upper part of said housing, especially located at the top of said housing. Preferably, said discharging outlet is located above the said baffle.

According to one embodiment of the present invention, said solid precipitation apparatus also comprises a support charge inlet and a support discharging outlet. Herein, said support charge inlet is generally located at the top or the upper part of said housing, preferably located at the top of said housing. Preferably, said support charge inlet is located above said guide structure, more preferably located above the said baffle. In addition, said support discharging outlet is generally located at the bottom of said housing, preferably located below said stream inlet.

According to one embodiment of the present invention, in order to realize said supercritical conditions, said solid precipitation apparatus can also include a hot-agent inlet. Herein, said hot-agent inlet is located at the bottom or the lower part of said housing, preferably located at the bottom of said housing. In addition, the structure of said hot-agent inlet is suitable for spraying said hot-agent into the inner chamber of said housing. As said structure, for example, a nozzle or a gas distributor can be enumerated, preferably a gas distributor, especially a gas distribution plate. Preferably, said gas distributor is substantially coaxial with the central axis of said housing. According to one embodiment of the present invention, said hot-agent is capable of raising the temperature of the stream to reach or exceed the supercritical temperature of the solvent by means of physical heat exchange or chemical heat release, or the like. As said hot-agent, specifically for example, an oxidizing gas such as air and oxygen gas or an oxidizing liquid such as hydrogen peroxide, and an aqueous persalt solution (collectively referred to as an oxidant), or a heating gas such as a vapor (e.g. a vapor of said solvent) can be enumerated. Preferably, said hot-agent is used in such an amount that said stream, after entering the inner chamber of said housing, forms the supercritical state, for example reaches or exceeds the supercritical temperature of said solvent. For example, said hot-agent and said stream are in such a proportion that after mixing them, the temperature of said stream rise to reach or exceed the supercritical temperature of said solvent. Herein, as the chemical heat release, for example, a case where said hot-agent chemically reacts with a certain component or certain components contained in said stream to release the heat can be enumerated. Particularly where the stream is a salt-containing wastewater or a high-salinity wastewater and said hot-agent is the oxidizing gas, the oxidizing gas and the organic contaminants in the salt-containing wastewater or the high-salinity wastewater are subjected to an oxidizing reaction to release the heat, thereby raising the temperature of the salt-containing wastewater or the high-salinity wastewater to reach or exceed the supercritical temperature of water, or where the salt-containing wastewater or the high-salinity wastewater remains a subcritical state prior to entering the solid precipitation apparatus, its temperature is raised by 4° C. or higher (preferably by 6-8° C.) to reach or exceed the supercritical temperature of water.

According to one embodiment of the present invention, said stream is a salt-containing wastewater or a high-salinity wastewater, especially a high-salinity organic wastewater, said hot-agent is said oxidizing gas, the used amount of said hot-agent is 100-500%, preferably 150-350% of the theoretical oxygen demand for the oxidation of said stream. Here, the theoretical oxygen demand for the oxidation is an oxygen amount required for the complete oxidation of COD in the organic wastewater.

According to one embodiment of the present invention, the conditions such as temperature and pressure when said hot-agent is charged into said inner chamber are not particularly limited. Herein, as said temperature, specifically for example, any temperature from room temperature to the supercritical temperature of the solvent (particularly, water) can be enumerated. As said pressure, specifically for example, any pressure capable of ensuring said hot-agent to be charged into said inner chamber can be enumerated, and more specifically for example, the pressure substantially identical to that of said stream can be enumerated.

According to one embodiment of the present invention, especially where said stream is a salt-containing wastewater or a high-salinity wastewater (especially a high-salinity organic wastewater) having a COD of greater than 20000 mg/L (preferably 20000-200000 mg/L or 20000-40000 mg/L), and said hot-agent is said oxidizing gas, even if the temperature of said hot-agent is much lower than the supercritical temperature of said solvent (especially water), for example at a substantially normal temperature, it is capable of raising the temperature of said stream to reach or exceed the supercritical temperature of said solvent, and therefore the expected technical effect of the present invention can be efficiently realized.

According to one embodiment of the present invention, in order to avoid the large fluctuation in the temperature in said solid precipitation apparatus, other organic wastewater, such as high-salinity organic wastewater with a higher or lower COD, can be added to said stream according to the circumstances, so that the COD content of said stream when entering said solid precipitation apparatus remains substantially constant.

According to one embodiment of the present invention, said hot-agent inlet is located above or below said stream inlet, preferably located below said stream inlet.

According to one embodiment of the present invention, said solid precipitation apparatus also comprises an inner tube (also in a hollow tube structure). As said inner tube, for example, straight tube-shaped or horn tube-shaped, especially straight cylinder-shaped can be enumerated. Preferably, said inner tube is substantially coaxial with the central axis of said housing.

According to one embodiment of the present invention, the outer diameter of said inner tube is generally 60-80%, preferably 67-73% of the inner diameter of said housing. In addition, the height of said inner tube is generally 20-60%, preferably 30-50% of the height of the inner chamber of said housing.

According to one embodiment of the present invention, said inner tube is located below said guide structure. In addition, said inner tube is preferably disposed in the lower part of the inner chamber of said housing.

According to one embodiment of the present invention, there exists a gap between the internal wall of said housing and the external wall of said inner tube (referred to as the fourth gap), especially an annular gap. In addition, there exists a gap between the lower edge or the internal wall of said inner tube and said hot-agent inlet (referred to as the fifth gap), especially an annular gap. Herein, said fifth gap is communicated with said fourth gap and the inner space of said inner tube. Preferably, said stream inlet is disposed in said fourth gap and below the upper edge of said inner tube. Further preferably, said stream inlet is 100-500 mm lower than the upper edge of said inner tube in the vertical direction.

According to one embodiment of the present invention, said inner tube has such a configuration that said hot-agent imported from said hot-agent inlet substantially wholly enters the inner space of said inner tube. Specifically, for example, referring to FIG. 3 or FIG. 4, the structure of said hot-agent inlet is a gas distributor, and said inner tube is located above said gas distributor or contains said gas distributor, both are partitioned by said fifth gap. In the first case, said inner tube has a projection on the gas distributor in the vertical direction, all the gas nozzle orifices of the gas distributor are arranged in the projection area. The present invention is not limited thereto and those skilled in the art can contemplate any possible configuration based on this requirement for the inner tube.

According to one embodiment of the present invention, the space of the inner chamber of said housing located below the upper edge of said inner tube is referred to as the buffer zone, then said buffer zone generally comprises 25-40% or 20-60% of the total volume of the inner chamber of said housing.

According to one embodiment of the present invention, in said buffer zone, said hot-agent and said stream are in such a proportion that the temperature of said stream, upon leaving the upper edge of said inner tube (namely leaving said buffer zone), rises to reach or exceed the supercritical temperature of said solvent. In particular, where said stream is a salt-containing wastewater or a high-salinity wastewater, and said hot-agent is said oxidizing gas, the reaction heat is released during the oxidative decomposition of the organic contaminants in the wastewater, resulting in that when the wastewater is in said buffer zone, its temperature is below the supercritical temperature of water, and when it leaves said buffer zone, its temperature rises to reach or exceed the supercritical temperature of water, thereby avoiding the salt precipitation in the buffer zone.

According to one embodiment of the present invention, as a process of operating said solid precipitation apparatus, for example, the following can be enumerated: said stream enters the lower part of the inner chamber of said housing from said stream inlet, said support enters the upper part of the inner chamber of said housing from said support charge inlet, and then enters the lower part of the inner chamber of said housing via said first gap, said third gap and said guide opening, said stream causes said support to be present in a flowing state, at least a part of said solute is deposited and loaded onto said support to form a loaded support, a part of said loaded support moves to the bottom of the inner chamber of said housing, and discharges the inner chamber of said housing from said support discharging outlet, another part of said loaded support moves to the upper part of the inner chamber of said housing along with said stream from which at least a part of the solute is removed (referred to as the purified stream), goes through said guide opening, enters said straight tube section from said conical diffusion section, and then discharges from said second gap, said loaded support refluxes to the lower part of the inner chamber of said housing via said first gap, said third gap and said guide opening, said purified stream moves to the top of the inner chamber of said housing via said the sixth gap, and discharges the inner chamber of said housing from said discharging outlet.

According to one embodiment of the present invention, as another process of operating said solid precipitation apparatus, for example, the following can be enumerated: said support enters the upper part of the inner chamber of said housing from said support charge inlet, and then enters the lower part of the inner chamber of said housing via said first gap, said third gap and said guide opening; said stream enters said fourth gap from said stream inlet, and then enters the inner space of said inner tube via said fifth gap, and mixes with said hot-agent that enters the inner space of said inner tube from said hot-agent inlet to form a mixture, which discharges said inner tube from the upper edge of said inner tube after the temperature rises to reach or exceed the supercritical temperature of said solvent; a part of said mixture refluxes to the inner space of said inner tube via said fourth gap and said fifth gap (forming an internal recycle), another part of said mixture causes said support to be present in a flowing state, at least a part of said solute is deposited and loaded onto said support to form a loaded support, a part of said loaded support moves to the bottom of the inner chamber of said housing via said fourth gap, and discharges the inner chamber of said housing from said support discharging outlet, another part of said loaded support moves to the upper part of the inner chamber of said housing along with said mixture from which at least a part of the solute is removed (referred to as the purified mixture), goes through said guide opening, enters said straight tube section from said conical diffusion section, and then discharges from said second gap, said loaded support refluxes to the lower part of the inner chamber of said housing via said first gap, said third gap and said guide opening, said purified mixture moves to the top of the inner chamber of said housing via said the sixth gap, and discharges the inner chamber of said housing from said discharging outlet.

Aaccording to one embodiment of the present invention, according to the circumstances, a pH regulating agent can be added to said stream and/or to the inner chamber of said housing, and said pH regulating agent is used in such an amount that the pH value of the content in the inner chamber of said housing is maintained at 9-13. Herein, as said pH regulating agent, any agent that can be used to adjust the pH value in the art can be enumerated, and specifically for example, sodium hydroxide, potassium hydroxide and the like can be enumerated without particular limitation. For this reason, said solid precipitation apparatus can be further provided with a pH adjusting device to adjust the stream to an alkaline environment, thereby preventing the apparatus from corrosion.

According to one embodiment of the present invention, according to the circumstances, said solid precipitation apparatus can also be provided with a heat-exchange equipment. Said heat-exchange equipment is used for the heat recovery between the discharged stream of said solid precipitation apparatus (for example the purified stream discharged from said stream outlet) and the feed to said solid precipitation apparatus (for example the stream charging from said stream inlet).

According to one embodiment of the present invention, it is obvious to those skilled in the art that any component contained by said solid precipitation apparatus, for example the apparatus housing, the inner member and the like, can be resistant in material and structure to the supercritical conditions (in particular high temperature and high pressure) of the solvent. For this reason, especially when used for the desalination of the high-salinity wastewater, the design pressure of these components is generally not less than 35 MPa, and the design temperature is generally not less than 650° C.

According to one embodiment of the present invention, it also relates to a solid precipitation process, especially a desalination process. The process comprises allowing the stream as described in any of the preceding aspects of the present description to enter the solid precipitation apparatus as described in any of the preceding aspects of the present description, and allowing the precipitate to be deposited and loaded on said support.

The present invention will be specifically described below by taking the desalination of the high-salinity wastewater as an example with reference to the accompanying drawings, but the present invention is not limited thereto.

The desalination process of the present invention will be described in more detail with reference to FIG. 1.

The wastewater firstly enters a heat exchanger 1, heat-exchanges with a high-temperature liquid after the gas-liquid separation, then enters an ebullated bed reactor 2 for the oxidation treatment of the supercritical water, and the oxidized wastewater can reach the standard after the gas-liquid separation and is discharged. The used ebullated bed reactor is a reactor conventionally adopted in the art and mainly comprises conventional components such as a reactor shell, a gas-liquid distribution disc, solid particles and the like. Solid particles in the ebullated bed reactor are periodically charged into and discharged out of the ebullated bed reactor through an online charging and discharging system, which comprises a solid particle on-line charging system 4 and a solid particle on-line discharging system 5. The solid particle on-line charging system 4 comprises a charging hopper, a charging tank and a valve. When it is necessary to charge the solid particles into the reactor, a valve between the charging tank and the reactor is firstly closed, then an emptying valve is opened to empty the charging tank, the solid particles in the charging hopper are charged into the charging tank by adopting gas transmission or liquid transmission or by means of gravity, then a valve on a pipeline is closed, and nitrogen is filled into the charging tank through a nitrogen pressurization valve, so that the pressure in the charging tank is basically equal to the reactor pressure. Then, the valve of the connecting pipeline between the charging tank and the reactor is opened, and the particles enter the reactor by gravity. The solid particle on-line discharging system 5 includes a solid particle discharging tank and a valve. Before discharging the salt-containing solid particle from the reactor, a valve of the connecting pipeline between the reactor bottom and a salt-containing solid particle discharging tank is firstly closed, the tank is filled with the feed wastewater, then a high-pressure nitrogen gas is introduced to the reaction pressure, the valve of the connecting pipeline between the reactor bottom and the salt-containing solid particle discharging tank is opened, and the particles are allowed to enter the solid particle discharging tank from the reactor bottom due to the action of gravity.

The structural features and the working principle of the desalination appartus of the present invention are as follows with reference to FIG. 2:

Said desalination apparatus comprises an apparatus housing 5 and inner members of the desalination apparatus, wherein the inner members of the desalination apparatus comprise a guide structure 7, a hollow tube 8 and an umbrella cap 9. The hollow tube 8 and the umbrella cap 9 located above the hollow tube are disposed above the guide structure 7, the upper and lower ends of said hollow tube are open, said hollow tube has a lower conical diffusion section, and the umbrella cap 9 is concentric with the hollow tube 8. The lower opening of the hollow tube 8 is a stream guide opening 6, the annular opening formed by the lower opening of the hollow tube and the inner wall of the desalination apparatus is a reflux inlet of solid particles in the desalination apparatus, and the separated solid particles return to the lower part of the desalination apparatus.

High-salinity wastewater is introduced from a feedstock inlet 1, passes through a liquid distributor 3 and then uniformly enters the desalination apparatus, so that solid particles 4 are present in a flowing state. Under the carrying action of the stream, the particle bed layer is expanded to a certain height, and the desalination reaction is carried out in the desalination apparatus, so that the salt is deposited on the particles. The reacted stream can entrain a part of particles to enter the hollow tube 8 and the umbrella cap 9 through the guide opening 6 surrounded by the guide structure 7 for separation, the separated particles reflux to the lower part of the desalination apparatus through the outer side of the inner member of the tube structure, and the desalted wastewater is discharged out of the desalination apparatus through a discharging outlet 10. In order to discharge the crystallized saturated solid particles out of the desalination apparatus in time and supplement the fresh particles, the fresh particles may be supplemented into the reaction system through the solid particle charging inlet 11 located at the upper part of the desalination apparatus, and the solid particles may be discharged out of the reaction system through the solid particle discharging outlet 2 located at the lower part of the desalination apparatus.

Figure 2:
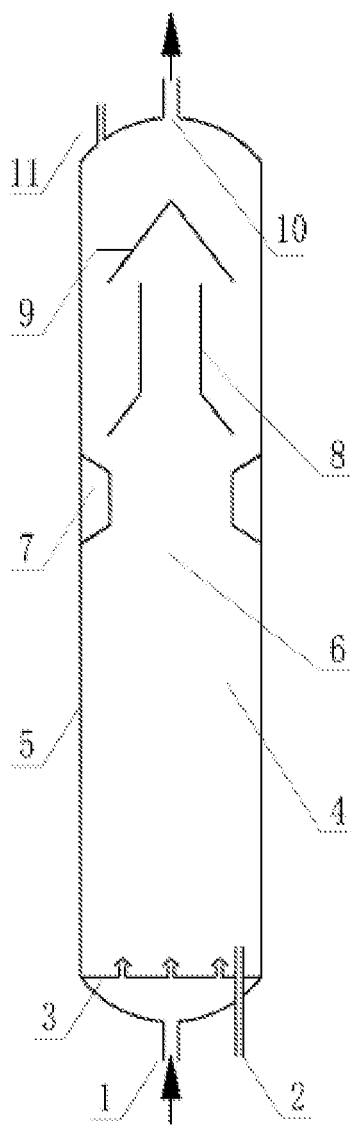
FIG. 2 is a structure schematic diagram of an embodiment of the desalination apparatus of the present invention.
Wherein 1: wastewater inlet, 2: solid particle discharging outlet, 3: liquid distributor, 4: solid particle, 5: apparatus housing, 6: guide opening, 7: guide structure, 8: hollow tube, 9: umbrella cap, 10: discharging outlet, 11: solid particle charging inlet.

The structural features and the working principle of the desalination appartus of the present invention are as follows with reference to FIG. 3:

On the basis of FIG. 2, an inner tube 12 and a gas distributor 3 are arranged in the lower part of the desalination apparatus, the gas distributor substitutes the liquid distributor, the inner tube 12 is located above the gas distributor, wastewater inlets 13 are arranged on two sides of the bottom of the desalination apparatus, and wastewater symmetrically enters an annular gap between the inner tube of the buffer zone and the inner wall of the apparatus housing.

High-salt wastewater enters an annular gap between the inner tube of the buffer zone and the inner wall of the apparatus housing from two symmetrical wastewater inlets 13 located at the lower part of the desalination apparatus, an internal recycle is formed in the buffer zone during operation, a gas enters the buffer zone through the gas inlet 1 and the gas distributor 3, solid particles are present in a flowing state under the action of gas and liquid, the temperature rises by 4-8° C. after the reaction in the buffer zone, the high-salinity wastewater enters the upper zone and reacts at certain temperature and pressure, the salt in the high-salinity wastewater is deposited on the solid particles, the solid particles having the deposited salt move downwards to the solid particle discharging outlet along with the reaction, the stream-after-the-reaction is subjected to a gas-solid two-phase separation, the solid phase returns to the desalination apparatus, and the gas phase is discharged out of the desalination apparatus.

The structural features and the working principle of the desalination appartus of the present invention are as follows with reference to FIG. 4:

Said desalination apparatus comprises an apparatus housing 6 and inner members of the desalination apparatus, wherein the inner members of the desalination apparatus comprise a hollow tube 7, an inner tube 4 and an umbrella cap 8. The upper and lower ends of the hollow tube are both open.

The high-salinity wastewater enters the annular gap between the inner tube 4 and the outer wall of the apparatus through two or more pairwise symmetrical feed inlets located at the lower part of the apparatus. The gas phase enters the apparatus from the lower part of the inner tube 4, the solid particles enter the apparatus from the upper part of the apparatus, an internal recycle is formed due to different gas contents inside and outside the inner tube, at the upper part of the inner tube, one part of the gas-liquid-solid mixture flows upwards to enter the hollow tube 7, and the other part of the gas-liquid-solid mixture enters the annular gap between the inner tube 4 and the outer wall of the apparatus and enters the interior of the hollow tube through the fourth gap and the third gap. The gas-liquid-solid mixture entering the hollow tube 7 flows upwards, the gas-liquid-solid three-phase separation is carried out after the gas-liquid-solid mixture reaches the top of the hollow tube 7, the solid particles and a part of the liquid phase enter the annular gap between the hollow tube 7 and the outer wall of the apparatus through the second gap and the first gap and reflux to the lower part of the apparatus. The gas phase and a part of the liquid phase are discharged out of the apparatus through an outlet 9 located at the upper part of the apparatus for the gas-liquid separation.

EXAMPLES

The present invention will be described in further detail below by way of examples and comparative examples, but the present invention is not limited to the following examples.

In the following examples and comparative examples, all test methods used, unless otherwise specified, were those conventional in the art, and all test materials used, unless otherwise specified, were purchased from conventional biochemical stores.

Example 1

By adopting the flow scheme shown in FIG. 1, in the high salinity organic wastewater, the COD concentration was 92600 mg/L, the TDS was 13.5 wt %, and the pH was 8.5.

The high salinity organic wastewater and oxygen were introduced into the ebullated bed reactor, wherein the solid particles in the ebullated bed reactor were alumina ceramic pellets with the diameter of 0.4 mm, the bulk density of 0.65 g/cm$^3$, the specific surface area of 260 m$^2$/g, and the addition amount of the solid particles was ½ of the volume of the reactor. The introduction amount of the oxidant was 300% of the theoretical oxygen demand for the oxidation of wastewater. The conditions of the supercritical oxidation were as follows: the reaction temperature was 600° C., the reaction pressure was 28 MPa, and the reaction residence time was 30 seconds. The charge and discharge amount of the solid particles during the reaction was 75 g.h$^{-1}$.L$^{-1}$ of the charged water. The salt in the wastewater was deposited on the solid particles in the ebullated bed reactor, the stream-after-the-reaction was subjected to a gas-liquid separation, the liquid phase could be discharged after heat-exchanging with the reactor feed wastewater, or the feed wastewater was diluted, the COD content entering the supercritical water oxidation reactor was kept stable, and the reaction was stably performed, avoiding a great fluctuation in the temperature in the reactor.

After the above-mentioned treatment, the discharged water had a COD concentration of 46 mg/L, and a TDS of 25 mg/L, which met the requirement for the direct discharge.

Example 2

By adopting the flow scheme shown in FIG. 1, in the high salinity organic wastewater, the COD concentration was 21700 mg/L, the TDS was 5.3 wt %, and the pH was 8.

The high salinity organic wastewater and oxygen were introduced into the ebullated bed reactor, wherein the solid particles in the ebullated bed reactor were alumina ceramic pellets with the diameter of 0.2 mm, the bulk density of 0.67 g/cm$^3$, the specific surface area of 100 m$^2$/g, and the addition amount of the solid particles was ⅓ of the volume of the reactor. The introduction amount of the oxidant was 150% of the theoretical oxygen demand for the oxidation of wastewater. The conditions of the supercritical oxidation were as follows: the reaction temperature was 380° C., the reaction pressure was 23 MPa, and the reaction residence time was 150 seconds. The charge and discharge amount of the solid particles during the reaction was 58 g.h$^{-1}$.L$^{-1}$ of the charged water. The salt in the wastewater was deposited on the solid particles in the ebullated bed reactor, the organic substance in the wastewater was oxidatively decomposed to carbon dioxide and water, the stream-after-the-reaction was subjected to a gas-liquid separation, the liquid phase could be discharged after heat-exchanging with the reactor feed wastewater, or the feed wastewater was diluted, the COD content entering the supercritical water oxidation reactor was kept stable, and the reaction was stably performed, avoiding a great fluctuation in the temperature in the reactor.

After the above-mentioned treatment, the discharged water had a COD concentration of 58 mg/L, and a TDS of 113 mg/L, which met the requirement for the direct discharge.

Example 3

By adopting the flow scheme shown in FIG. 1, in the high salinity organic wastewater, the COD concentration was 137200 mg/L, the TDS was 14.3 wt %, and the pH was 8.7.

The high salinity organic wastewater and oxygen were introduced into the ebullated bed reactor, wherein the solid particles in the ebullated bed reactor were alumina ceramic pellets with the diameter of 0.7 mm, the bulk density of 0.62 g/cm$^3$, the specific surface area of 300 m$^2$/g, and the addition amount of the solid particles was ½ of the volume of the reactor. The introduction amount of the oxidant was 350% of the theoretical oxygen demand for the oxidation of wastewater. The conditions of the supercritical oxidation were as follows: the reaction temperature was 650° C., the reaction pressure was 30 MPa, and the reaction residence time was 30 seconds. The charge and discharge amount of the solid particles during the reaction was 79 g.h$^{-1}$.L$^{-1}$ of the charged water. The salt in the wastewater was deposited on the solid particles in the ebullated bed reactor, the organic substance in the wastewater was oxidatively decomposed to carbon dioxide and water, the stream-after-the-reaction was subjected to a gas-liquid separation, the liquid phase could be discharged after heat-exchanging with the reactor feed wastewater, or the feed wastewater was diluted, the COD content entering the supercritical water oxidation reactor was kept stable, and the reaction was stably performed, avoiding a great fluctuation in the temperature in the reactor.

After the above-mentioned treatment, the discharged water had a COD concentration of 54 mg/L, and a TDS of 23 mg/L, which met the requirement for the direct discharge.

Example 4

The same procedure was performed according to Example 1, except that air was used as oxidant. After the above-mentioned treatment, the discharged water had a COD concentration of 59 mg/L, and a TDS of 26 mg/L.

Example 5

The same procedure was performed according to Example 1, except that the solid particles were silica pellets with the diameter of 0.5 mm, and the specific surface area of 230 m$^2$/g. After the above-mentioned treatment, the discharged water had a COD concentration of 53 mg/L, and a TDS of 62 mg/L.

Example 6

The same procedure was performed according to Example 1, except that sodium hydroxide was added to the feed wastewater to control the pH of the charged water to 11. After the above-mentioned treatment, the COD and the TDS in the discharged water were not changed greatly. But the pH value of the charged water was controlled to be alkaline, and the alkaline substances in the wastewater can neutralize the acidic substances generated in the reaction process, thereby avoiding the corrosion of the reactor.

Example 7

The desalination apparatus of the present invention as shown in FIG. 2 was used, wherein the apparatus had an inner chamber height of 2 m and an inner diameter of 0.17 m, the outer diameter of the straight tube section of the hollow tube was 0.12 m, the height of the straight tube section of the hollow tube was 0.4 m, the cone angle of the umbrella cap was 100°, the height of the umbrella cap was 0.25 m, the outer diameter of the umbrella cap was 0.14 m, the maximum outer diameter of the conical diffusion section was 0.14 m, the height of the conical diffusion section was 0.15 m, the guide structure was a ring structure having a trapezoidal section with a height of 0.2 m, the inner diameter of the guide opening was 0.13 m, the coverage angle Alpha was 45°, the friction angle Beta was 45°. In the high-salinity organic wastewater, the TDS was 13.5 wt %, and the pH was 8.5.

The high-salinity organic wastewater (temperature: 360° C., pressure: 30 MPa) was introduced into the desalination apparatus, wherein the solid particles in the desalination apparatus were alumina ceramic pellets with the diameter of 0.4 mm, the bulk density of 0.65 g/cm3, and the specific surface area of 260 m$^2$/g, and the addition amount of the solid particles was ½ of the volume of the reactor. In the inner chamber of the apparatus, the operation temperature was 600° C., the pressure was 28 MPa, and the residence time was 30 seconds. The solid particle charging and discharging amount was 75 g.h$^{-1}$.L$^{-1}$ of the charged water. After the treatment, the discharged water had a TDS of 113 mg/L.

After 100 days of the continuous operation, no blockage occurred in the apparatus and the pipelines.

Example 8

Figure 3:
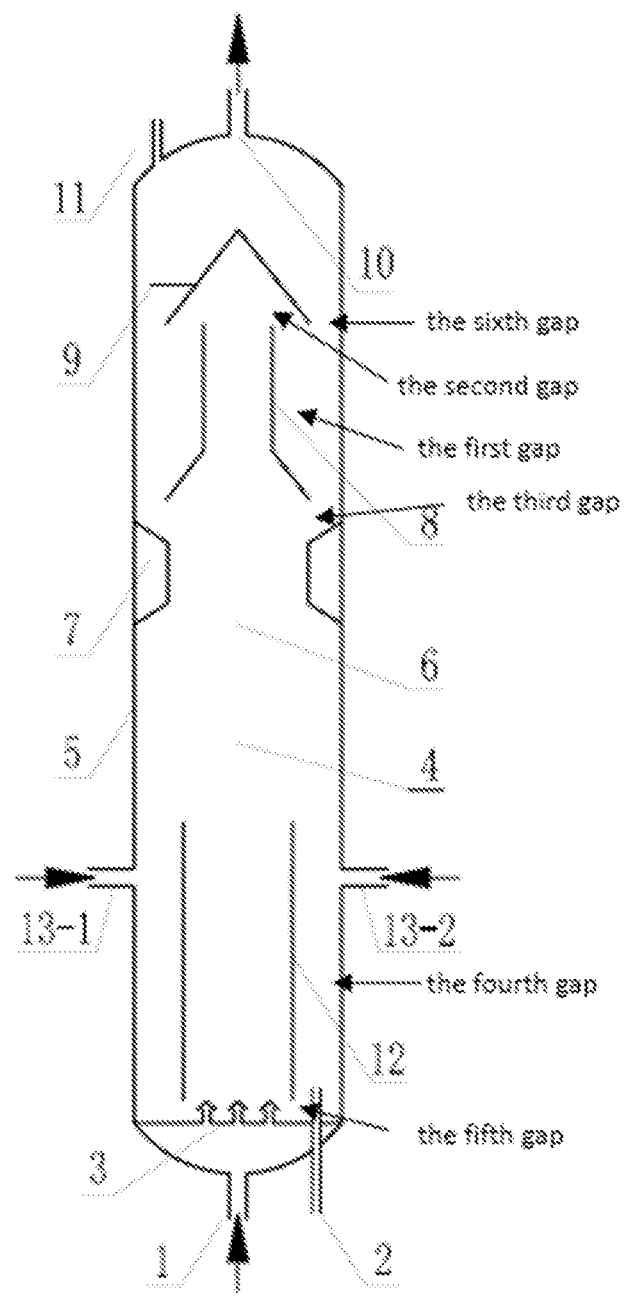
FIG. 3 is a structure schematic diagram of another embodiment of the desalination apparatus of the present invention.
Wherein 1: gas inlet, 2: solid particle discharging outlet, 3: gas distributor, 4: solid particle, 5: apparatus housing, 6: guide opening, 7: guide structure, 8: hollow tube, 9: umbrella cap, 10: discharging outlet, 11: solid particle charging inlet, 12: inner tube, 13-1,2: wastewater inlet.

The desalination apparatus of the present invention as shown in FIG. 3 was used, wherein the apparatus had an inner chamber height of 2 m and an inner diameter of 0.17 m, the outer diameter of the straight tube section of the hollow tube was 0.12 m, the height of the straight tube section of the hollow tube was 0.4 m, the cone angle of the umbrella cap was 100°, the height of the umbrella cap was 0.25 m, the outer diameter of the umbrella cap was 0.14 m, the maximum outer diameter of the conical diffusion section was 0.14 m, the height of the conical diffusion section was 0.15 m, the guide structure was a ring structure having a trapezoidal section with a height of 0.2 m, the inner diameter of the guide opening was 0.13 m, the coverage angle Alpha was 45°, the friction angle Beta was 45°, the inner tube had an outer diameter of 0.12 m and a height of 0.7 m, the high-salinity organic wastewater inlet was 200 mm lower than the upper edge of the inner tube in the vertical direction. In the high-salinity organic wastewater, the COD concentration was 92600 mg/L, the TDS was 13.5 wt %, and the pH was 8.5.

The high-salinity organic wastewater (temperature: normal temperature, pressure: 30 MPa) and oxygen gas (temperature: normal temperature, pressure: 30 MPa) were introduced into the desalination apparatus, wherein the solid particles in the desalination apparatus were alumina ceramic pellets with the diameter of 0.4 mm, the bulk density of 0.65 g/cm$^3$, and the specific surface area of 260 m$^2$/g, and the addition amount of the solid particles was ½ of the volume of the reactor. The introduction amount of the oxygen gas was 300% of the theoretical oxygen demand for the oxidation of wastewater. In the inner chamber of the apparatus, the operation temperature was 600° C., the pressure was 28 MPa, and the residence time was 30 seconds. The solid particle charging and discharging amount was 75 g.h$^{-1}$.L$^{-1}$ of the charged water. After the above-mentioned treatment, the discharged water had a COD concentration of 54 mg/L, and a TDS of 63 mg/L, which met the requirement for the direct discharge.

After 100 days of the continuous operation, no blockage occurred in the apparatus and the pipelines.

Example 9

Figure 4:
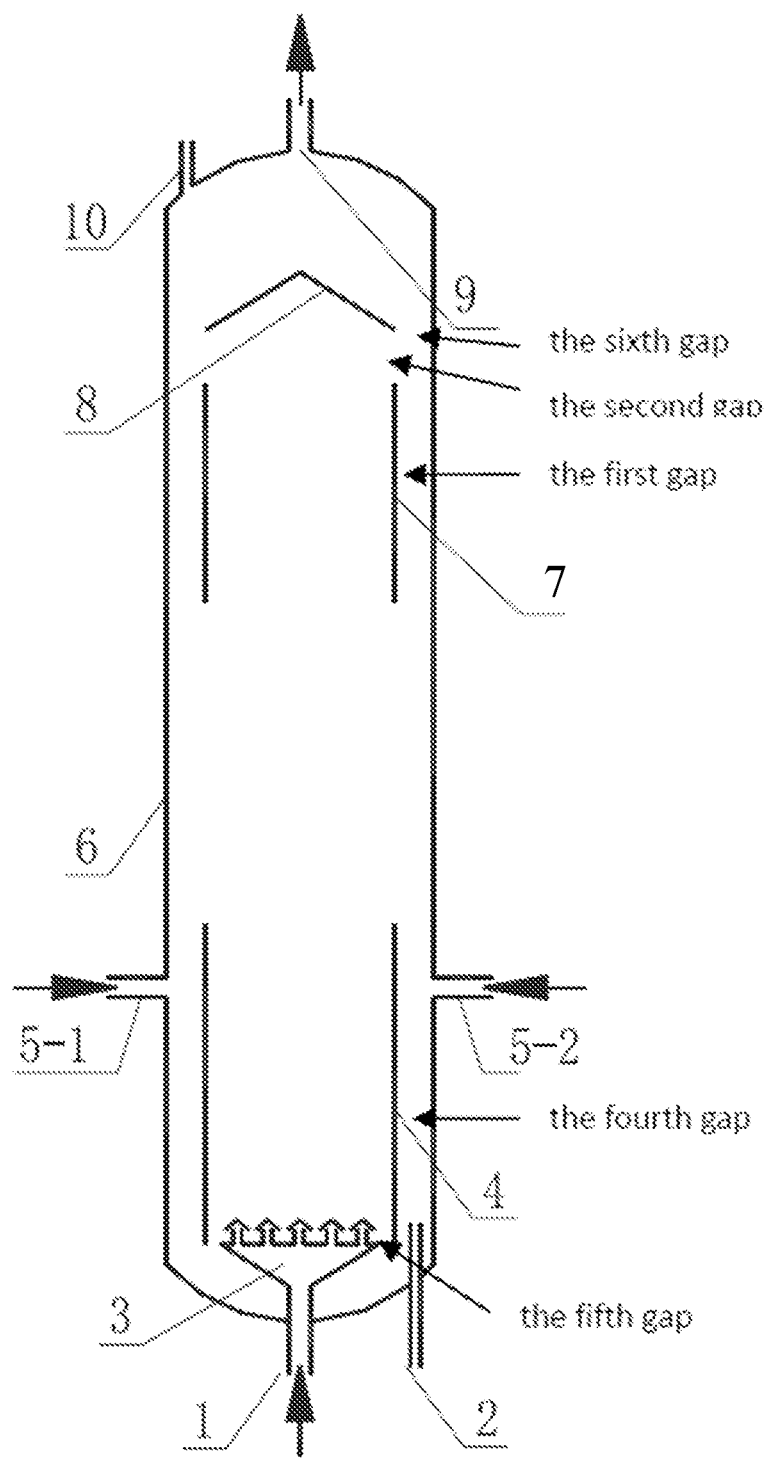
FIG. 4 is a structure schematic diagram of another embodiment of the desalination apparatus of the present invention.
Wherein 1: gas inlet, 2: solid particle discharging outlet, 3: gas distributor, 4: inner tube, 5-1,2: wastewater inlet, 6: apparatus housing, 7: hollow tube, 8: umbrella cap, 9: discharging outlet, 10: solid particle charging inlet.

The desalination apparatus of the present invention as shown in FIG. 4 was used, wherein the apparatus had an inner chamber height of 2 m and an inner diameter of 0.17 m, the outer diameter of the straight tube section of the hollow tube was 0.12 m, the height of the straight tube section of the hollow tube was 0.4 m, the cone angle of the umbrella cap was 100°, the height of the umbrella cap was 0.25 m, the outer diameter of the umbrella cap was 0.12 m, the inner tube had an outer diameter of 0.12 m and a height of 0.7 m, the high-salinity organic wastewater inlet was 150 mm lower than the upper edge of the inner tube in the vertical direction. In the high-salinity organic wastewater, the COD concentration was 92600 mg/L, the TDS was 13.5 wt %, and the pH was 8.5.

The high-salinity organic wastewater (temperature: normal temperature, pressure: 30 MPa) and oxygen gas (temperature: normal temperature, pressure: 30 MPa) were introduced into the desalination apparatus, wherein the solid particles in the desalination apparatus were alumina ceramic pellets with the diameter of 0.4 mm, the bulk density of 0.65 g/cm$^3$, and the specific surface area of 260 m$^2$/g, and the addition amount of the solid particles was 1/2 of the volume of the reactor. The introduction amount of the oxygen gas was 300% of the theoretical oxygen demand for the oxidation of wastewater. In the inner chamber of the apparatus, the operation temperature was 600° C., the pressure was 28 MPa, and the residence time was 30 seconds. The solid particle charging and discharging amount was 75 g.h$^{-1}$.L$^{-1}$ of the charged water. After the above-mentioned treatment, the discharged water had a COD concentration of 46 mg/L, and a TDS of 43 mg/L, which met the requirement for the direct discharge. After 100 days of the continuous operation, no blockage occurred in the apparatus and the pipelines.

Example 10

The same procedure was performed according to Example 8, except that the solid particles were silica pellets with the diameter of 0.5 mm, and the specific surface area of 230 m$^2$/g. After the above-mentioned treatment, the discharged water had a COD concentration of 53 mg/L, and a TDS of 62 mg/L.

Example 11

The same procedure was performed according to Example 8, except that sodium hydroxide was added to the charged high-salinity organic wastewater to control the pH of the charged water to 11. After the above-mentioned treatment, the COD and the TDS in the discharged water were not changed greatly. But the pH value of the charged water was controlled to be alkaline, and the alkaline substances in the wastewater can neutralize the acidic substances generated in the desalination process, thereby avoiding the corrosion of the apparatus.

Example 12

The same procedure was performed according to Example 7, except that hollow tube, umbrella cap and guide structure were not provided. After the above-mentioned treatment, the discharged water had a TDS of 436 mg/L.

After 30 days of the continuous operation, slight blockage occurred in the apparatus and the pipelines.

Comparative Example 1

The same procedure was performed according to Example 1, except that an ordinary reactor was used rather than the ebullated bed reactor. After the above-mentioned treatment, the discharged water had a COD concentration of 96 mg/L, and a TDS of 138700 mg/L, and the blockage occurred both in the reactor and the pipelines.

Comparative Example 2

The same procedure was performed according to Example 1, except that the treatment was performed with an ebullated bed reactor under the conditions of reaction temperature of 270° C., reaction pressure of 9.0 MPa and residence time of 1 h. After the above-mentioned treatment, the discharged water had a COD concentration of 13790 mg/L, and a TDS of 14270 mg/L.

Comparative Example 3

The same procedure was performed according to Example 7, except that no solid particle was added to the apparatus. After the above-mentioned treatment, the discharged water had a TDS of 138700 mg/L.

After only 1 day of the continuous operation, severe blockage occurred in the apparatus and the pipelines.

The invention claimed is:

1. A solid precipitation apparatus, comprising:
a housing;
an inlet for a stream that comprises a solvent and a solute;
a discharging outlet;
a support disposed in an inner chamber of said housing; and
an inner member disposed in the inner chamber of said housing,
wherein said support comprises solid particles, and said inner member comprises a hollow tube substantially coaxial with a central axis of said housing, an upper end and a lower end of said hollow tube are open, and a baffle is disposed above said hollow tube, and
wherein said hollow tube comprises an upper straight tube section and a lower conical diffusion section, a first gap is disposed between the internal wall of said housing and the external wall of said hollow tube, a second gap is disposed between said baffle and the upper edge of said hollow tube, and a sixth gap is disposed between said baffle and the internal wall of said housing.

2. The solid precipitation apparatus of claim 1 is configured to be operated under a supercritical condition.

3. The solid precipitation apparatus of claim 1, wherein said solid particles are selected from at least one of crystal seeds, inorganic particles, silica sphere, sand, quartz sand, refractory material particles, and solid waste.

4. The solid precipitation apparatus of claim 1, wherein the used amount (by volume) of said solid particles is ¼-¾ of the total volume of the inner chamber of said housing, and/or, the equivalent diameter of said solid particles is 0.1-1.0 mm, and/or, the specific surface area of said solid particles is 100-300 $m^2/g$, and/or, the bulk density of said solid particles is 0.6-0.7 $g/cm^3$.

5. The solid precipitation apparatus of claim 1, wherein said umbrella cap is coaxial with said hollow tube, and has a cone angle of 30-150°, and/or, the outer diameter of said straight tube section of said hollow tube is 60-80% of the inner diameter of said housing, and/or, the height of the straight tube section of said hollow tube is 10-30% of the height of the inner chamber of said housing, and/or, the maximum outer diameter of said conical diffusion section of said hollow tube is 75-90% of the inner diameter of said housing, and/or, the height of said conical diffusion section of said hollow tube is 3-10% of the height of the inner chamber of said housing, and/or, the height of said baffle is 5-20% of the height of the inner chamber of said housing.

6. The solid precipitation apparatus of claim 1, further comprising a guide structure disposed around the internal wall of said housing, said guide structure is disposed about the inner chamber of said housing to form a channel that is open at the top and bottom, said guide structure is disposed below said hollow tube and above said stream inlet, a third gap is disposed between said guide structure and the lower edge of said hollow tube, and/or, said guide structure is substantially coaxial with the central axis of said housing, and/or, said guide structure is disposed in the upper part of the inner chamber of said housing.

7. The solid precipitation apparatus of claim 1, wherein said stream inlet is located at the bottom or the lower part of said housing, the structure of said stream inlet is suitable for spraying said stream into the inner chamber of said housing, and/or, said discharging outlet is located at the top or the upper part of said housing, and/or, the ratio of the height of the inner chamber of said housing (the unit is m) to the inner diameter (the unit is m) is 7-17, and/or, the inner diameter of said guide structure is 60-80% of the inner diameter of said housing, and/or, the height of said guide structure is 5-15% of the height of the inner chamber of said housing.

8. The solid precipitation apparatus of claim 1, further comprising a support charge inlet and a support discharging outlet, and/or, said support charge inlet is located at the top or the upper part of said housing, and/or, said support discharging outlet is located at the bottom of said housing.

9. The solid precipitation apparatus of claim 1, further comprising a hot-agent inlet, said hot-agent inlet is located at the bottom or the lower part of said housing, the structure of said hot-agent inlet is fit for the hot-agent to spray into the inner chamber of said housing, and/or, said hot-agent inlet is located above or below said stream inlet.

10. The solid precipitation apparatus of claim 9, further comprising an inner tube, said hot-agent inlet is located at the bottom of said housing, a fourth gap disposed between the internal wall of said housing and the external wall of said inner tube, a fifth gap disposed between the lower edge or the internal wall of said inner tube and said hot-agent, said fifth gap is in communication with said fourth gap and the inner space of said inner tube, said inner tube has such a configuration that said hot-agent imported from said hot-agent inlet substantially wholly enters the inner space of said inner tube, said stream inlet is disposed in said fourth gap and below the upper edge of said inner tube, and/or, the space of the inner chamber of said housing located below the upper edge of said inner tube is referred to as the buffer zone, then said buffer zone is 20-60% of the total volume of the inner chamber of said housing, and/or, the structure of said hot-agent inlet is a gas distributor, and said inner tube is located above said gas distributor or contains said gas distributor, both are partitioned by said fifth gap, and/or, said inner tube is located below said guide structure, and/or, said stream inlet is 100-500 mm lower than the upper edge of said inner tube in the vertical direction, and/or, the outer diameter of said inner tube is 60-80% of the inner diameter of said housing, and/or, the height of said inner tube is 20-60% of the height of the inner chamber of said housing, and/or, said inner tube is disposed in the lower part of the inner chamber of said housing.

11. A solid precipitation process comprising: passing a stream containing a solute and a solvent into the solid precipitation apparatus of claim 1 to cause at least a part of the solute to be deposited on said support disposed in the inner chamber of said housing.

12. The solid precipitation process of claim 11, wherein said stream, before entering said solid precipitation apparatus, is kept at a subcritical state, and/or, the temperature of said support is higher than the supercritical temperature of said solvent, and/or, a support is added to the inner chamber of said housing, and the temperature of said support is higher than the supercritical temperature of said solvent, and/or, said support and said stream are in such a proportion that after mixing them, the temperature of said stream reaches or exceeds the supercritical temperature of said solvent.

13. The solid precipitation process of claim 11, wherein the operation conditions for the inner chamber of said housing include: the operation pressure is 23-35 MPaG, the operation temperature is 350-650° C., the stream residence time is 10-1800 seconds, and the space velocity is 1.5-270 $h^{-1}$.

14. The solid precipitation process of claim 11, further comprising adding a hot-agent to the inner chamber of said housing, and said hot-agent is used in such an amount that said stream, after entering the inner chamber of said housing, forms the supercritical state, and/or, said stream is a salt-containing wastewater or a high salinity, said hot-agent is an oxidizing gas, and/or, said hot-agent and said stream are in such a proportion that after mixing them, the temperature of said stream reaches or exceeds the supercritical temperature of said solvent, and/or, said hot-agent and said stream are in such a proportion that the temperature of said stream, upon leaving the upper edge of said inner tube, reaches or exceeds the supercritical temperature of said solvent, and/or, the used amount of said hot-agent is 100-500% of the theoretical oxygen demand for the oxidation of said stream.

15. The solid precipitation process of claim 11, further comprising adding a pH regulating agent to said stream and/or to the inner chamber of said housing to maintain the pH value of the content in the inner chamber of said housing at 9-13.

16. The solid precipitation process of claim 11, wherein said stream enters the lower part of the inner chamber of said housing from said stream inlet, said support enters the upper part of the inner chamber of said housing from said support charge inlet, and then enters the lower part of the inner chamber of said housing via said first gap, said third gap and said guide opening, said stream causes said support to be present in a flowing state, at least a part of said solute is deposited and loaded onto said support to form a loaded support, a part of said loaded support moves to the bottom of the inner chamber of said housing, and discharges the inner chamber of said housing from said support discharging outlet, another part of said loaded support moves to the upper part of the inner chamber of said housing along with said stream from which at least a part of the solute is removed (referred to as the purified stream), goes through said guide opening, enters said straight tube section from said conical diffusion section, and then discharges from said second gap, said loaded support refluxes to the lower part of the inner chamber of said housing via said first gap, said third gap and said guide opening, said purified stream moves to the top of the inner chamber of said housing via said the sixth gap, and discharges the inner chamber of said housing from said discharging outlet, or, said support enters the upper part of the inner chamber of said housing from said support charge inlet, and then enters the lower part of the inner chamber of said housing via said first gap, said third gap and said guide opening, said stream enters said fourth gap from said stream inlet, and then enters the inner space of said inner tube via said fifth gap, and mixes with said hot-agent that enters the inner space of said inner tube from said hot-agent inlet to form a mixture, which discharges said inner tube from the upper edge of said inner tube after the temperature rises to reach or exceed the supercritical temperature of said solvent, a part of said mixture refluxes to the inner space of said inner tube via said fourth gap and said fifth gap to form an internal recycle, another part of said mixture causes said support to be present in a flowing state, at least a part of said solute is deposited and loaded onto said support to form a loaded support, a part of said loaded support moves to the bottom of the inner chamber of said housing via said fourth gap, and discharges the inner chamber of said housing from said support discharging outlet, another part of said loaded support moves to the upper part of the inner chamber of said housing along with said mixture from which at least a part of the solute is removed (referred to as the purified mixture), goes through said guide opening, enters said straight tube section from said conical diffusion section, and then discharges from said second gap, said loaded support refluxes to the lower part of the inner chamber of said housing via said first gap, said third gap and said guide opening, said purified mixture moves to the top of the inner chamber of said housing via said the sixth gap, and discharges the inner chamber of said housing from said discharging outlet.

17. The solid precipitation process of claim 11, wherein said stream is a high salinity wastewater, said high salinity wastewater has a TDS of not higher than 20 wt %, and a COD of greater than 20000 mg/L.

18. The solid precipitation apparatus of claim 1, said solid precipitation apparatus is a desalination apparatus, and/or the housing is vertical cylindrical housing, and/or said stream is salt-containing wastewater or high-salinity wastewater.

19. The solid precipitation apparatus of claim 1, wherein the inner member is disposed in the upper part of the inner chamber of said housing, and/or the first gap is an annular gap, and/or said baffle is an umbrella cap, and/or said baffle is substantially coaxial with the central axis of said housing, and/or the second gap is an annular gap, and/or the sixth gap is an annular gap.

20. The solid precipitation apparatus of claim 5, wherein said umbrella cap has a cone angle of 60-120°, and/or, the outer diameter of said straight tube section of said hollow tube is 67-73% of the inner diameter of said housing.

21. The solid precipitation apparatus of claim 6, wherein the longitudinal section of said guide structure along the central axis of the said housing is a trapezoid, and/or the coverage angle Alpha and the friction angle Beta of said trapezoid are 5-70°, and/or said guide structure is a cylindrical channel, and/or said third gap is an annular gap.

22. The solid precipitation apparatus of claim 7, wherein said stream inlet is a nozzle or a liquid distributor, and/or, said discharging outlet is located above the said baffle, and/or, the ratio of the height of the inner chamber of said housing to the inner diameter is 10-14 m.

23. The solid precipitation apparatus of claim 8, wherein said support charge inlet is located above the said baffle, and/or, said support discharging outlet is located below said stream inlet.

24. The solid precipitation apparatus of claim 10, wherein said inner tube is straight tube-shaped or horn tube-shaped, and/or said inner tube is substantially coaxial with the central axis of said housing, and/or the fourth gap is an annular gap, and/or the fifth gap is an annular gap, and/or, said gas distributor is substantially coaxial with the central axis of said housing, and/or, the outer diameter of said inner tube is 67-73% of the inner diameter of said housing, and/or, the height of said inner tube is 30-50% of the height of the inner chamber of said housing.

25. The solid precipitation process of claim 11, wherein said process is a desalination process, and/or said solute is an inorganic salt and said solvent is water, and/or at least a part of the solute is precipitated due to a precipitation reaction or due to supersaturation.

26. The solid precipitation process of claim 12, wherein said stream, before entering said solid precipitation apparatus, is kept at a subcritical state, wherein the temperature is lower than the supercritical temperature of said solvent which is from room temperature to a temperature of 1-15° C. lower than the supercritical temperature of said solvent, or wherein the pressure is at or higher than the supercritical pressure of said solvent but the temperature is lower than the supercritical temperature of said solvent which is from room temperature to a temperature of 1-15° C. lower than the supercritical temperature of said solvent, and/or, the temperature of said support is 1-15° C. higher than said supercritical temperature, and/or, the support added to the inner chamber of said housing is at a temperature of 1-15° C. higher than said supercritical temperature.

27. The solid precipitation process of claim 14, wherein said stream after entering the inner chamber of said housing, reaches or exceeds the supercritical temperature of said solvent, and/or, said stream is a high salinity organic wastewater, and/or, said hot-agent is an oxygen gas or air, and/or, the used amount of said hot-agent is 150-350% of the theoretical oxygen demand for the oxidation of said stream.

28. The solid precipitation apparatus of claim 6, further comprising a support charge inlet and a support discharging outlet, wherein said support charge inlet is located above said guide structure.

\* \* \* \* \*